(12) United States Patent
Li et al.

(10) Patent No.: US 9,063,247 B2
(45) Date of Patent: Jun. 23, 2015

(54) OPTIMIZING SUBTERRANEAN TREATMENT CHARACTERISTIC BY DIGITAL GEOINFORMATICS

(75) Inventors: Gang Li, Houston, TX (US); David B. Allison, Spring, TX (US); Andrew J. Eis, Spring, TX (US); Ahmed Kenawi, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 270 days.

(21) Appl. No.: 13/415,149

(22) Filed: Mar. 8, 2012

(65) Prior Publication Data

US 2013/0236064 A1   Sep. 12, 2013

(51) Int. Cl.
*G06K 9/00* (2006.01)
*G01V 1/30* (2006.01)

(52) U.S. Cl.
CPC ............ *G01V 1/30* (2013.01); *G01V 2210/646* (2013.01)

(58) Field of Classification Search
CPC ....................................................... G06K 9/00
USPC ......................................................... 382/109
See application file for complete search history.

(56) References Cited

U.S. PATENT DOCUMENTS

| 7,128,144 B2 | 10/2006 | Fox et al. | |
|---|---|---|---|
| 2008/0294387 A1 | 11/2008 | Anderson et al. | |
| 2009/0110242 A1 | 4/2009 | Touati et al. | |
| 2009/0259446 A1* | 10/2009 | Zhang et al. | 703/2 |
| 2010/0118653 A1* | 5/2010 | He et al. | 367/57 |
| 2011/0120706 A1* | 5/2011 | Craig | 166/270 |
| 2012/0014218 A1* | 1/2012 | Houck et al. | 367/72 |

FOREIGN PATENT DOCUMENTS

| WO | 2009137565 A1 | 11/2009 |
|---|---|---|
| WO | 2013134039 A2 | 9/2013 |

OTHER PUBLICATIONS

Derzhi et al., "Comparison of Traditional and Digital Rock Physics Techniques to Determine the Elastic Core Parameters in Cretaceous Formations, Abu Dhabi," Abu Dhabi International Petroleum Exhibition & Conference held in Abu Dhabi, UAE, Nov. 2010, SPE-138586-PP.
Rassenfoss, "Digital Rocks Out to Become a Core Technology," JPT/JPT Online, May 2011.
Potyondy, "The Effect of Void Shape on the Mechanical Properties of Rock," Abstract for 4th International Conference on Discrete Element Methods, Aug. 2007.
Fakhimi et al., "Discrete Element Modeling of the Influence of Void Size and Distribution on the Mechanical Behavior of Rock," Proceedings of the 3rd CANUS Rock Mechanics Symposium, Toronto, May 2009.

(Continued)

*Primary Examiner* — Stephen R Koziol
*Assistant Examiner* — Delomia Gilliard
(74) *Attorney, Agent, or Firm* — McDermott Will & Emery LLP; Craig W. Roddy

(57) ABSTRACT

Methods for acquiring, cataloguing, and analyzing digital core samples taken of subterranean formations are disclosed. One embodiment provides a method that includes obtaining an image or a series of images of at least a portion of a subterranean formation; simulating, by a computing device, a fracturing characteristic of the subterranean formation based on the image or the series of images; and cataloguing the image or the series of images in a formation fingerprinting database.

14 Claims, 1 Drawing Sheet

(56) References Cited

OTHER PUBLICATIONS

International Search Report and Written Opinion for PCT/US2013/028259 dated Feb. 12, 2014.

Boulis et al., "An Innovative Approach to Understanding Shale Gas Well Behavior Based on a Performance Catalogue Fingerprint," SPE Asia Pacific Oil and Gas Conference and Exhibition, SPE 160271, Oct. 22, 2012, pp. 1-12, XP007922515.

Majidi et al., "Fingerprint of Mud Losses into Natural or Induced Fractures," SPE European Formation Damage Conference, SPE 143854, Jun. 7, 2011, pp. 1-12, XP007922517.

* cited by examiner

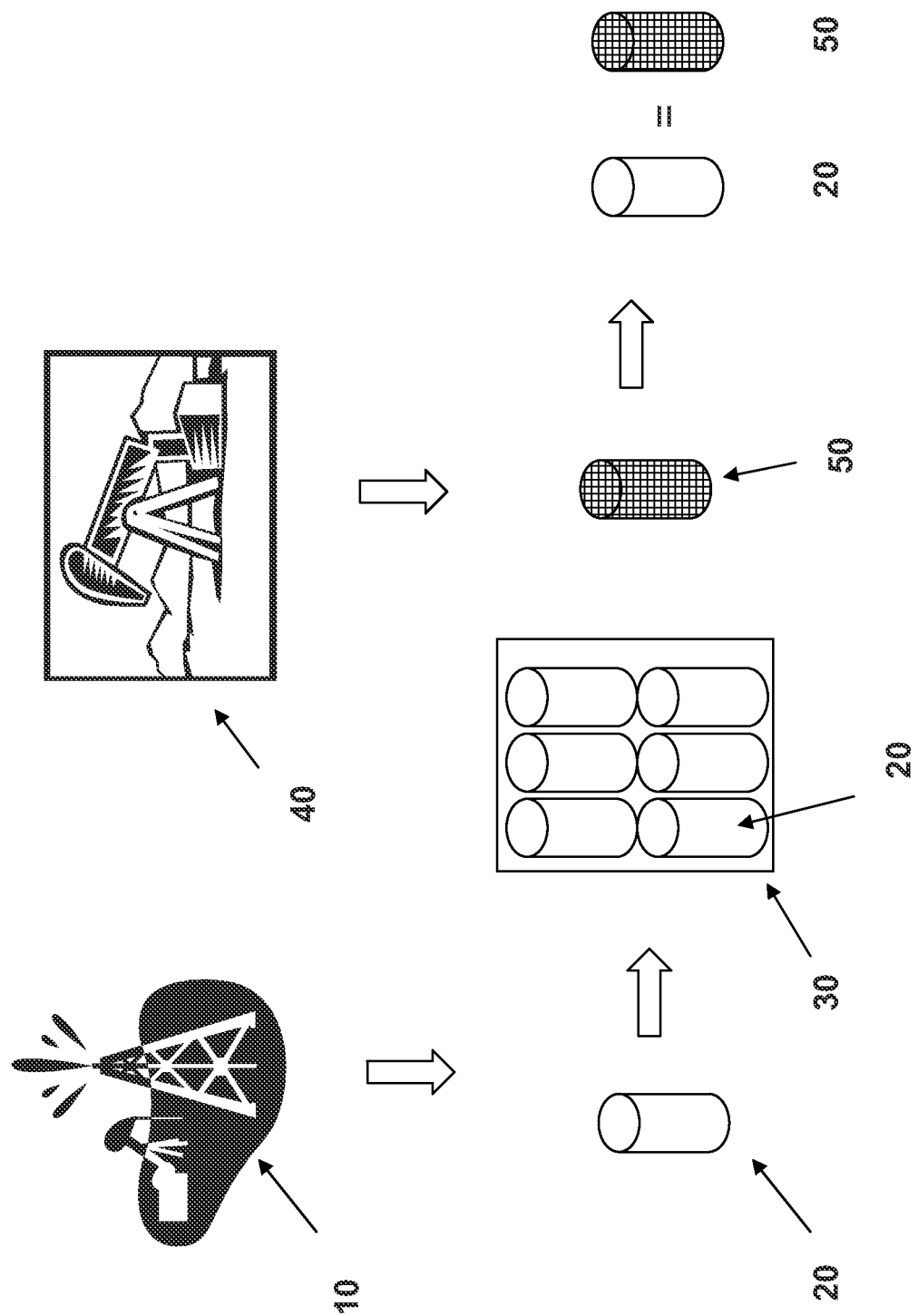

OPTIMIZING SUBTERRANEAN TREATMENT CHARACTERISTIC BY DIGITAL GEOINFORMATICS

BACKGROUND

The present invention relates to digital geoinformatics. More specifically, the present invention relates to the acquiring, cataloguing, and analyzing of digital core samples taken of subterranean formations and their applications in the optimization of oilfield techniques.

Digital imaging techniques allow for the creation, process, and storage of digital data that can be analyzed for a number of purposes. While traditional imaging is typically confined to 2-D optical systems (e.g., cameras, optical microscopes, etc.) that operate within the visible light range, digital imaging can also take advantage of other imaging systems such as, but not limited to, computer tomography (CT), magnetic resonance imaging (MRI), confocal microscopes, and the like.

In particular, computer tomography is widely used as a tool in radiology to detect abnormalities such as infarctions, tumors, calcifications, bone traumas, etc. This is often achieved by generating a three-dimensional image of the inside of a patient from a large series of two-dimensional x-ray images taken. Although these images are usually generated in an axial or transverse plane, modern imaging techniques allow the imaging data to be reformatted in various planes or even as volumetric (i.e., three-dimensional) representations of structures.

Confocal microscopes may digitally construct three-dimensional images by using point illumination and spatial pinhole to eliminate out-of-focus light. Confocal microscopes often have the ability to obtain a series of 2-D images through the use of two-dimensional scanning and a moveable stage that can change the focal plane within a specimen. The series of two-dimensional images can be stacked on top of each other to construct a three-dimensional image.

Digital imaging systems such as computer tomography and confocal microscope also have the potential to be used as tools for visualizing and characterizing subterranean formations. For example, a rock fragmentation analysis system that includes a camera and image processing system may be used to analyze blasted rocks to assess the quality of blasts. A laser scanning confocal microscope system may be used to characterize three-dimensional samples of rocks for determining the flow properties of the samples. Despite some of these efforts, digital imaging systems and techniques have not been widely applied or used to analyze subterranean formations.

SUMMARY OF THE INVENTION

The present invention relates to digital geoinformatics. More specifically, the present invention relates to the acquiring, cataloguing, and analyzing of digital core samples taken of subterranean formations and their applications in the optimization of oilfield techniques.

In some embodiments, the present invention provides methods comprising: obtaining an image or a series of images of at least a portion of a subterranean formation; simulating, by a computing device, a fracturing characteristic of the subterranean formation based on the image or the series of images; and cataloguing the image or the series of images in a formation fingerprinting database.

In other embodiments, the present invention provides methods comprising: obtaining a digital core sample comprising: an image or a series of images of at least a portion of a subterranean formation having a fracturing characteristic; simulating, by a computing device, the fracturing characteristic of the subterranean formation using a numerical method; and searching for a homologous digital core sample or a nearest homologous digital core sample in a formation fingerprinting database.

In still other embodiments, the present invention provides methods comprising: obtaining a first digital core sample of a first subterranean formation having a first fracturing characteristic; simulating, by a computing device, the first fracturing characteristic of the first subterranean formation; obtaining a second digital core sample of a second subterranean formation having a second fracturing characteristic; simulating, by a computing device, the second fracturing characteristic of the second subterranean formation; formulating a fracturing system based on a comparison of the first and second digital core samples; and introducing the fracturing system into the second subterranean formation.

The features and advantages of the present invention will be readily apparent to those skilled in the art upon a reading of the description of the preferred embodiments that follows.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIG. 1 is a flow chart illustrating an exemplary method in accordance with some embodiments of the present invention.

DETAILED DESCRIPTION

The present invention relates to digital geoinformatics. More specifically, the present invention relates to the acquiring, cataloguing, and analyzing of digital core samples taken of subterranean formations and their applications in the optimization of oilfield techniques.

As used herein, the term "digital geoinformatics" may refer to a relatively new field or an emerging field relating to any of the aspects of acquiring, cataloguing, analyzing, visualizing, or retrieving spatial data that digitally represents at least a portion of a subterranean formation. In some cases, digital geoinformatics may specifically refer to the cataloguing of digital core samples, which may be later retrieved and used to predict the characteristics of new or previously uncharacterized subterranean formations. These predictions may be particularly useful for optimizing subsequent subterranean operations (i.e., subsequent best practice operations) such as fracturing or drilling operations. The specific subsequent best practice operation will depend on the subterranean application that an operator is intending to perform. For example, in hydraulic fracturing applications, the subsequent operation may be the formulation of a fracturing fluid, the introduction of a fracturing fluid into the subterranean formation, the introduction of proppants into fractures, and the like. For the purposes of this disclosure, digital geoinformatics may also encompass annotating the digital core samples with certain geomechanical properties such as, but not limited to, fracturing characteristics. In some cases, these fracturing characteristics may be obtained by conventional core sample analysis.

As used herein, a "core sample" refers to a sample of subterranean formation that is usually taken during or after drilling a well. Conventional core analysis takes core samples from reservoir rock and analyzes key properties of the reservoir rock, such as porosity, permeability, wettability, etc. These properties may be measured using traditional analytical instruments such as a porosimeter which measures rock porosity and a permeater which measures the permeability of rock, for example, by measuring the speed of gas passing through a dried core sample. In general, the core sample may be of any size or shape. In some preferred embodiments, the core sample is a cylinder or cylindrically shaped. In some preferred embodiments, the diameter of the core sample may range from about 1 inch to about the diameter of the drill bit that was used to obtain the core sample.

As used herein, the term "digital core sample" refers to a core sample that has been imaged or digitally constructed using a digital system such as, but not limited to, scanning electron microscopy, focused ion beam scanning electron microscopy, computed tomography scanning, nuclear magnetic resonance, etc. In some embodiments, these digital systems may be operated by a computing device, which stores the captured digital images. A user may operate the imaging systems directly or through a computing device.

In some respects, the digital core sample may be considered a "virtual" formation. The virtual formation may include information such as, but not limited to, spatial map of the pore spaces, minerals, gas, hydrocarbons, etc. In some embodiments, the virtual formation may include information on how the various features (e.g., pore spaces) of the subterranean formation are connected. In some cases, a core sample may be imaged using non-digital means (e.g., optical microscope) and later digitized (e.g., by a digital scanner). In some cases, a digital core sample may be annotated with certain characteristics (e.g., fracture type, fracture density, etc.). The digital core samples may generally be of any size and any shape.

The present invention provides systems and methods for obtaining digital core samples. This may be accomplished by, for example, taking a digital image of a core sample. In some cases, a three-dimensional imaging method may be used to create a three-dimensional virtual formation. These images may then be catalogued to create a library of characterized subterranean formations, which may be used to predict the characteristics (e.g., geomechanical properties) of previously uncharacterized subterranean formations. These systems and tools may be used to predict the real world characteristics of subterranean formations, optimize subsequent subterranean operation, and the like.

While at least some of the embodiments described herein relate to fracturing applications, this is merely an example and not intended to be limiting in any respect. For example, embodiments of the present invention may be practiced with any compatible subterranean applications such as drilling, acidizing, etc.

Exemplary examples of formation characteristics important in fracturing applications include, but are not limited to, fracture type, fracture density, fracture distributions, fracture generating mechanisms, and the like. These may be generally referred to as the "fracturability" of a subterranean formation. In some embodiments, fracturability may be a quotient ("aggregate fracturability quotient") that considers at least one fracture characteristic of a subterranean formation.

It is believed that the present invention may reduce the time required to reach optimization of fracturing operations down to about days and confirming the optimizations in a few wells (about less than 5). In comparison, conventional optimization of fracturing operations can take years, testing the operations in hundreds if not thousands of wells through a process of trial and error. For example, the optimization of the Barnett Shale took approximately 15 years and required testing in thousands of wells. While recent advances in optimization techniques have reduced this time, the optimization of the Haynesville Shale still took approximately 3 years and hundreds of wells. Thus, the present invention can significantly cut down on the time and effort required to optimize oilfield techniques in new subterranean formations. This may be particularly advantageous in environments that may currently be risk adverse (e.g., Europe, certain national oil companies, etc.). This significant reduction in time should also provide considerable cost benefits.

The present invention provides methods generally comprising: obtaining an image or a series of images of at least a portion of a subterranean formation; simulating a fracturing characteristic of the subterranean formation based on the image or the series of images; and cataloguing the image or the series of images in a formation fingerprinting database.

The term "obtain" does not necessarily imply a specific action or the origin of the image. In other words, one may obtain an image by, for example, operating an image capturing device, transferring a captured image from an image capturing device to a storage unit (e.g., a computer or computer related medium), digitizing an analog image to a digital image, and the like. As used herein, the term "images" may refer to a single image including digitally modeled images and a series of images (e.g., three-dimensional image).

Images may be obtained by using any compatible imaging technique on a sample taken from a subterranean formation. In some embodiments, the sample is selected from the group consisting of: a drill cutting, a core sample, combinations thereof, or the like. A drill cutting may be a broken bit of solid material removed from a borehole. In some embodiments, the borehole is drilled by rotary, percussion, auger methods, or any other suitable method. In other embodiments, a core sample is obtained by, for example, a core drilling method, which typically produces a solid cylindrical sample of rock or soil. In some embodiments, a digital core sample may be constructed at least in part from data gathered from a drill cutting and from data gathered from a core sample.

The images may be obtained by any compatible technique in accordance with the embodiments of the present invention. Suitable examples of imaging techniques include, but are not limited to, scanning electron microscopy, focused ion beam scanning electron microscopy, computed tomography scanning, nuclear magnetic resonance, and combinations thereof. The quality (e.g., resolution) of the digital images generally depends on the imaging system and technique used. While it is generally desirable to obtain the highest resolution images possible, factors such as time, computing power, cost, core sample size, core sample quality, etc. may determine the quality of images captured and used. These imaging systems and techniques are well known in the art.

In some embodiments, a non-digital imaging method may be used to obtain images that are subsequently digitized. Digitization may be through any method that is suitable in accordance with the embodiments of the present invention. Suitable systems capable of digitizing images include, but are not limited to, digital scanners, digital cameras, and the like.

The images may generally be of any dimension. In some embodiments, the images may be two-dimensional. In some embodiments, a plurality of two-dimensional images may be used to construct a three-dimensional image or a three-dimensional model (e.g., a calculated 3-D NMR structure, a 3-D stack of 2-D images) of the imaged object. In some embodiments, the images may be dynamic (i.e., show time-dependent changes). This may be achieved by a numerical method that simulates, for example, the transport of fluids through pore spaces in response to pressure. Examples of time-dependent changes may include, but are not limited to, a subterranean formation's response to a treatment fluid, a fracture propagating after hydraulic fracturing, a propagation of a crack or cracks in a subterranean formation in response to stress, or a flow of hydrocarbons and other mobile reservoir matter.

In some embodiments, the images may be captured downhole in real-time. In such embodiments, the image capturing device may be sent downhole. In some embodiments, the image capturing device may be coupled to the drill bit. Real-time image capturing may be particularly advantageous in that the sample of the subterranean formation will generally have fewer opportunities to degrade or become contaminated. In other embodiments, a sample of the subterranean formation may be obtained and imaged later at the surface.

The images may generally be analyzed to determine certain characteristics of the subterranean formation. Such analysis may be achieved by the use of a numerical method that simulates a certain characteristic. In some embodiments, such analysis may also be achieved by visual inspection or use of software to digitally process the images. These characteristics may include, for example, uniaxial compressive strength, Young's modulus, Poisson's ratio, porosity, permeability, fracture density, fracture distribution, fracture mechanism, fracture pattern, and chemical bonding of the subterranean formation.

In some embodiments, a characteristic of the subterranean formation may be simulated using any compatible numerical method in accordance with the embodiments of the present invention. Without being limited by theory, it is believed that numerical methods may be used to simulate a fracturing characteristic of the subterranean formation. A fracturing characteristic may include, but is not limited to, fracture density, fracture distribution, fracture mechanism, fracture pattern, chemical bonding of the subterranean formation, and combinations thereof. In some embodiments, each element of the numerical method may represent a small portion of the subterranean formation. In some embodiments, the small portion may have dimensions on the scale of about nanometers to about micrometers. Generally, the smaller the dimensions, the smaller the scale of the fracture mechanisms (i.e., micro fracture mechanism). For example, a micro-scale element method may permit the investigation of micro-fracture function (e.g., if the micro-fracture functions independently or aggregately in the macro environment.) An element that is made up by larger portions will tend to generate relatively larger scale fracture mechanisms (i.e., macro fracture mechanisms).

Exemplary examples of numerical methods include, but are not limited to, discrete elemental methods, finite elemental methods, finite difference method, boundary elemental method, and combinations thereof. U.S. Pat. No. 7,128,144 and U.S. 2008/0294387 describe some examples of the use of numerical methods to simulate aspects of a subterranean formation, the entireties of which are hereby incorporated by reference. The application of these numerical methods are computationally intensive and typically require the use of a computer device. While at least some of the embodiments disclose the use of a computing device, such use is not essential to the making and practicing of the present invention.

Computer system (or "computing device") can include, in addition to hardware, codes that create an execution environment for the computer program in question, e.g., codes that constitute processor firmware, a protocol stack, a database management system, an operating system, or a combination of one or more stored in an included memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus for storing information and instructions to be executed by the processor. The processor and the memory can be supplemented by, or incorporated in, special purpose logic circuitry.

The instructions may be stored in the memory and implemented in one or more computer program products, i.e., one or more modules of computer program instructions encoded on a computer readable medium for execution by, or to control the operation of, the computer system, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory may also be used for storing temporary variable or other intermediate information during execution of instructions to be executed by the processor.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

In some embodiments, the simulated fracturing characteristic may be calibrated based on a measured value of the fracturing characteristic of the same subterranean formation. This calibration may be, for example, experimentally established (i.e., comparisons between simulated and measured values). In some cases, this calibration may allow for corrections in the prediction of a fracturing characteristic based on a simulated fracturing characteristic.

A formation fingerprinting database is generally an electronic database (typically storable on a computer-related or machine-readable media) that stores images of subterranean formations. In some embodiments, the formation fingerprinting database may also catalog (or annotate) one of: a fracturing characteristic, an aggregate fracturability quotient, or both. An aggregate fracturability quotient may be a value that indicates, for example, one of: a subsequent operation to use a particular formulation of treatment fluid to use, a proppant size to use, a critical drawdown pressure to control proppant flowback, a well placement in tight formations for drainage optimization, a wellbore, a perforation hole stability, a volume of liquid(s) to use in a treatment, a volume of proppant(s) to use in a treatment, a treatment pressure, and an equipment specification. In some embodiments, the formation fingerprinting database may also include a characteristic of the subterranean formation selected from the group consisting of: mineralogy, rock texture, porosity, grain size distribution, natural fracture, best practice procedure, and combinations thereof. In some embodiments, these characteristics may be annotated in the corresponding images of the subterranean formation. In some embodiments, the formation fingerprinting database may be stored on a server. In some embodiments, the formation fingerprinting database may be accessible remotely such as through the world-wide web.

Machine-readable media may include storage integrated into a processing system. Machine-readable media may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a non-transitory machine-readable medium, a machine-readable storage medium, or a non-transitory machine-readable storage medium. In one aspect, a computer-readable medium is a non-transitory computer-readable medium, a computer-readable storage medium, or a non-transitory computer-readable storage medium. Instructions may be executable, for example, by a client device or server or by a processing system of a client device or server. Instructions can be, for example, a computer program including code.

Some embodiments provide methods comprising: obtaining a digital core sample comprising: an image or a series of images of at least a portion of a subterranean formation having a fracturing characteristic; simulating, by a computing device, the fracturing characteristic of the subterranean formation using a numerical method; and searching for a homologous digital core sample or a nearest homologous digital core sample in a formation fingerprinting database.

In some embodiments, the formation fingerprinting database comprises at least one digital core sample of a subterranean formation. In some embodiments, the digital core sample will have a known fracturing characteristic that is either previously measured, previously simulated, or both. The digital core sample with known fracturing characteristics may be compared with a digital core sample having an unknown or previously uncharacterized fracturing characteristic.

Such comparison may enable the search for a homologous digital core sample or nearest homologous digital core sample within the formation fingerprinting database. In some embodiments, the search may be based on at least one of: fracture density, fracture distribution, fracture mechanism, fracture pattern, chemical bonding of the subterranean formation, mineralogy, rock texture, porosity, grain size distribution, natural fracture, aggregate fracturability quotient, and any combination thereof.

In some embodiments, the identification of the homologous digital core sample or the nearest homologous digital core sample allows the identification of subsequent best practice technique that is associated with the homologous digital core sample or the nearest homologous digital core sample. Examples of techniques that may be optimized to best practice include, but are not limited to, fracturing (e.g., fluid composition, fluid volumes), adding proppant (e.g., proppant amounts, proppant volumes), completion technique, and any combination thereof.

In some embodiments, the formulation of the fracturing fluid optimizes at least one property of the fracturing fluid. The property of the fracturing fluid may include: viscosity, salt concentration, density, proppant type, and any combination thereof. A fracturing fluid generally comprises: a base fluid, and at least one additive selected from the group of: an acid, a biocide, a breaker, a clay stabilizer, a corrosion inhibitor, a crosslinker, a friction reducer, a gelling agent, an iron control agent, a scale inhibitor, a surfactant, a proppant, and combinations thereof.

Some embodiments provide methods comprising: obtaining a first digital core sample of a first subterranean formation having a first fracturing characteristic; simulating, by a computing device, a first fracturing characteristic of the first subterranean formation; obtaining a second digital core sample of a second subterranean formation having a second fracturing characteristic; simulating, by a computing device, a second fracturing characteristic of the second subterranean formation; formulating a fracturing system based on a comparison of the first and second digital core samples; and introducing the fracturing system into the second subterranean formation.

In some embodiments, the fracturing characteristic of the first subterranean formation is experimentally measured. In some embodiments, the formulation of the fracturing system optimizes at least one property of the fracturing system. In some embodiments, the property of the fracturing system comprises at least one property selected from the group consisting of: viscosity, salt concentration, density, proppant type, and any combination thereof.

To facilitate a better understanding of the present invention, the following examples of preferred embodiments are given. In no way should the following examples be read to limit, or to define, the scope of the invention.

EXAMPLE 1

FIG. 1 summarizes the steps involved in one prophetic embodiment of the present invention. A core sample (not shown) is obtained from an existing formation 10 and digitally imaged to generate a digital core sample 20. A finite elemental method is then used to simulate the fracturing density of the existing formation 10. In one or more embodiments, the value of fracturing density may be confirmed experimentally in a laboratory. The digital core sample 20 and the fracturing density values (simulated and experimental) may then be catalogued in a formation fingerprinting database 30. The formation fingerprinting database 30 may include other digital core samples taken from other existing formations. A calibration may also be performed to find the relationship between experimental and simulated fracturing density values.

A new digital core sample 50 may also be taken from a new formation 40. The finite elemental method used above may then be used to simulate the fracturing density of the new formation 40. Based on the simulated fracturing density value and the mineralogy of the new formation 40, a homologous digital core sample is identified within the formation fingerprinting database 30. The homologous digital core sample is annotated with best practice fracturing procedures, which may be further optimized using the calibration relationship and applied to the new formation 40.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   obtaining a digital core sample of a subterranean formation comprising: an image or a series of images of a core sample, a drill cutting, or both from the subterranean formation having a fracturing characteristic, wherein the image or series of images are obtained under dynamic conditions to show a time-dependent change in the core sample, the drill cutting, or both and by a technique selected from the group consisting of: scanning electron microscopy, focused ion beam scanning electron microscopy, x-ray computed tomography scanning, nuclear magnetic resonance, and any combination thereof;
   simulating, by a computing device, the fracturing characteristic of the subterranean formation selected from the group consisting of: fracture density, fracture distribution, fracture mechanism, fracture pattern, chemical bonding of the subterranean formation, and any combination thereof using a numerical method; and
   searching for a homologous digital core sample or a nearest homologous digital core sample in a formation fingerprinting database that includes digital core samples for a plurality of subterranean formations that do not correspond to the subterranean formation from which the core sample, the drill cutting, or both were obtained.

2. The method of claim 1 wherein the image or the series of images are digitized.

3. The method of claim 1 wherein the homologous digital core sample or the nearest homologous digital core sample is identified based on at least one of: the fracture density, the fracture distribution, the fracture mechanism, the fracture pattern, the chemical bonding of the subterranean formation, mineralogy, rock texture, porosity, grain size distribution, natural fracture, aggregate fracturability quotient, and any combination thereof.

4. The method of claim 1 wherein the formation fingerprinting database comprises at least one digital core sample of a subterranean formation having a previously simulated or previously measured fracturing characteristic or both.

5. The method of claim 1 further comprising: identifying a best practice technique that is associated with the homologous digital core sample or the nearest homologous digital core sample.

6. The method of claim 5 wherein the best practice technique is one of: fracturing, adding proppant, completion, and any combination thereof.

7. A method comprising:
   providing a formation fingerprinting database that includes digital core samples for a plurality of subterranean formations that are correlated to (1) fracturing characteristics of each of the plurality of subterranean formations and (2) fracturing procedures performed in each of the plurality of subterranean formations;
   obtaining a sample for a new subterranean formation that is not one of the plurality of subterranean formations, the sample being a core sample, a drill cutting, or both;
   obtaining an image or series of images of the sample;
   simulating at least one fracturing characteristic of the new subterranean formation based on the images or the series of images of the sample;
   searching the formation fingerprinting database for a homologous or near-homologous digital core sample corresponding to one of the plurality of subterranean formations by comparing the fracturing characteristics of each of the plurality of subterranean formations in the formation fingerprinting database and the at least one fracturing characteristic of the new subterranean formation; and
   formulating a fracturing system for the new subterranean formation based on the fracturing procedure corresponding to the homologous or near-homologous digital core sample.

8. The method of claim 7, wherein simulating at least one fracturing characteristic of the new subterranean formation based on the images or the series of images of the sample involves simulating propagation of a crack or cracks in the new subterranean formation in response to a stress by a numerical method.

9. The method of claim 8, wherein the numerical method is a discrete element method.

10. The method of claim 7, wherein the at least one fracturing characteristic of the new subterranean formation includes at least one selected from the group consisting of: a fracture density, a fracture distribution, a fracture mechanism, a fracture pattern, a chemical bonding of the new subterranean formation, and any combination thereof.

11. The method of claim 7, wherein each of the digital core samples in the formation fingerprinting database are annotated with characteristics of each of the plurality of subterranean formations, wherein the characteristics are selected from the group consisting of: a mineralogy, a rock texture, a porosity, a grain size distribution, an aggregate fracturability quotient, and any combination thereof.

12. A method comprising:
providing a formation fingerprinting database that includes digital core samples for a plurality of subterranean formations that are correlated to (1) characteristics of each of the plurality of subterranean formations, wherein the characteristics are selected from the group consisting of: a mineralogy, a rock texture, a porosity, a grain size distribution, an aggregate fracturability quotient, and any combination thereof, (2) fracturing characteristics of each of the plurality of subterranean formations, and (3) fracturing procedures performed in each of the plurality of subterranean formations;
obtaining a sample for a new subterranean formation that is not one of the plurality of subterranean formations, the sample being a core sample, a drill cutting, or both;
measuring at least one of the characteristics of the sample of the new subterranean formation;
obtaining an image or series of images of the sample;
simulating at least one fracturing characteristic of the new subterranean formation based on the images or the series of images of the sample, wherein the at least one fracturing characteristic of the new subterranean formation includes at least one selected from the group consisting of: a fracture density, a fracture distribution, a fracture mechanism, a fracture pattern, a chemical bonding of the new subterranean formation, and any combination thereof;
searching the formation fingerprinting database for a homologous or near-homologous digital core sample corresponding to one of the plurality of subterranean formations by (1) comparing the characteristics of the sample of the new subterranean formation and the each of the plurality of subterranean formations in the formation fingerprinting database and (2) comparing the fracturing characteristics of each of the plurality of subterranean formations in the formation fingerprinting database and the at least one fracturing characteristic of the new subterranean formation; and
formulating a fracturing system for the new subterranean formation based on the fracturing procedure corresponding to the homologous or near-homologous digital core sample.

13. The method of claim 12, wherein simulating at least one fracturing characteristic of the new subterranean formation based on the images or the series of images of the sample involves simulating propagation of a crack or cracks in the new subterranean formation in response to a stress by a numerical method.

14. The method of claim 12, wherein the numerical method is a discrete element method.

* * * * *